United States Patent
Chu

(10) Patent No.: US 9,712,104 B2
(45) Date of Patent: Jul. 18, 2017

(54) CONTROL METHOD OF OVER-TEMPERATURE PROTECTION, DRIVER CHIP AND CONTROL SYSTEM OF OVER-TEMPERATURE PROTECTION

(71) Applicant: NUVOTON TECHNOLOGY CORPORATION, Hsinchu (TW)

(72) Inventor: Ping-Ying Chu, Hsinchu (TW)

(73) Assignee: Nuvoton Technology Corporation, Hsinchu (TW)

( * ) Notice: Subject to any disclaimer, the term of this patent is extended or adjusted under 35 U.S.C. 154(b) by 0 days.

(21) Appl. No.: 15/225,414

(22) Filed: Aug. 1, 2016

(65) Prior Publication Data
US 2017/0104438 A1   Apr. 13, 2017

(30) Foreign Application Priority Data
Oct. 8, 2015   (TW) .............................. 104133318 A

(51) Int. Cl.
*G05D 23/00*   (2006.01)
*H02P 29/68*   (2016.01)

(52) U.S. Cl.
CPC .................................... *H02P 29/68* (2016.02)

(58) Field of Classification Search
CPC .......... H05K 7/20; G05D 23/00; G05D 23/02; G05D 23/30; H02P 1/00; H02P 3/00; H02P 4/00; H02P 5/00; H02P 6/00; H02P 7/00; H02P 29/60; H02P 29/68

USPC ......... 318/400.01, 400.14, 400.15, 700, 701, 318/721, 779, 430, 432, 437, 599, 811, 318/471, 472; 361/23, 24, 679.48, 695; 388/800, 819, 821; 700/21, 300, 153, 700/256

See application file for complete search history.

(56) References Cited

U.S. PATENT DOCUMENTS 6,996,441 B1 *   2/2006   Tobias ............... G05D 23/1919
165/104.33

\* cited by examiner

*Primary Examiner* — Antony M Paul
(74) *Attorney, Agent, or Firm* — Muncy, Geissler, Olds & Lowe, P.C.

(57) ABSTRACT

A control method of over-temperature protection, a driver chip and a control system of over-temperature protection are disclosed. The control method includes the following steps: a driver chip provides an output voltage to drive a DC fan. A temperature of the driver chip is detected by an over-temperature detection module. When the temperature of the driver chip is higher than a first threshold value, the power supplying to the driver chip is stopped, so that the driver chip can cool down. After the temperature of the driver chip is lower than a second threshold value, the driver chip is restarted. A preset voltage is provided to the DC fan by the driver chip and the DC fan rotates at a preset rotational speed which is higher than the rotational speed.

20 Claims, 5 Drawing Sheets

CONTROL METHOD OF OVER-TEMPERATURE PROTECTION, DRIVER CHIP AND CONTROL SYSTEM OF OVER-TEMPERATURE PROTECTION

CROSS-REFERENCE TO RELATED APPLICATION

This application claims the benefit of Taiwan Patent Application No. 104133318, filed on Oct. 8, 2015, in the Taiwan Intellectual Property Office, the disclosure of which is incorporated herein in its entirety by reference.

BACKGROUND OF THE INVENTION

1. Field of the Invention

The present disclosure relates to a control method of over-temperature protection, a driver chip, and a control system of over-temperature protection, particularly with regard to the driver chip for driving a high current DC fan, and the control method and system capable of controlling the output voltage to drive the DC fan to rotate at a full rotational speed, so as to prevent the driver chip from being overheated.

2. Description of the Related Art

When assembling electronic devices (such as computer hosts or barebones), a user can select different motherboards, CPUs, or different casings for combination, and even select any type of DC fans for cooling. Since efficiency of processors and memories are improved, it is foreseeable that power consumption and heat generation in operation of the component will continue to increase. In order to protect the components of the electronic devices from being damaged or destroyed because of the high temperature, user may choose a DC fan having a higher power for heat dissipation of the electronic device.

However, manufacturers of the motherboard or driver chip cannot predict a power value of the DC fan selected by the users, so they generally estimate a larger current value to encompass all possible current values of DC fans, for example, discrete metal oxide semiconductor field effect transistors (MOSFET) combined with driver chip and circuitry of DC fans. However, the manufacturers do not design protection circuits for the discrete MOSFET so that issues of overheating and burn-out often occur. If the over-temperature protection, over-current protection circuits and driving voltage amplification circuits are integrated in the driver chip, the driver chip can drive DC fans in most conditions, but still cannot drive the DC fans by a high current to have high heat dissipation.

Meanwhile, because of cost consideration, manufacturers are reluctant to increase the chip area for improvement in heat dissipation to meet the requirement of some high-current DC fans. Therefore, a control method of over-temperature protection, a driver chip, and a control system of over-temperature protection shall be designed, wherein shortcoming of prior arts are improved by the present disclosure. The integrated driver chip for DC fans is also adapted to large current DC fans, which enhances the practical application in the industry.

SUMMARY OF THE INVENTION

Regarding above problems, the present disclosure provides a control method of over-temperature protection, a driver chip, and a control system of over-temperature protection. The present disclosure solves the problem that conventional driver chips for DC fans cannot load or bear a large driving current required by the DC fans, which causes the DC fans disable to rotate to dissipate the heat.

According to one purposes of the present disclosure, a control method of over-temperature protection is provided. The control method is adapted to a driver chip for driving a DC fan, and includes the following steps:

a. providing an output voltage to the DC fan by the driver chip so as to drive the DC fan to rotate at a rotational speed;

b. detecting whether a temperature of the driver chip is higher than a first threshold value, by an over-temperature detection module;

c. stopping supplying power to the driver chip when the temperature of the driver chip is higher than the first threshold value, so as to cool down the driver chip;

d. restarting the driver chip when the temperature of the driver chip is lower than a second threshold value; and e. providing a preset voltage to the DC fan by the driver chip, so as to drive the DC fan to rotate at a preset rotational speed which is higher than the rotational speed.

Preferably, the preset voltage is a maximum driving voltage, and the driver chip drives the DC fan by the maximum driving voltage to rotate at a full rotational speed.

Preferably, the control method further includes a step of: detecting whether over-current is occurred in the driver chip, by using an over-current detection module, and the step e further includes a sub-step of:

e'. check whether the over-current is occurred in the driver chip, if yes, providing an originally-set output voltage to drive the DC fan; if no, providing the preset voltage to drive the DC fan to rotate at the preset rotational speed.

Preferably, the driver chip is connected to a hardware monitor or a super input/output (I/O) chip, which transmits a control command to the driver chip for controlling the driver chip.

Preferably, the driver chip is controlled by the control command to provide the preset voltage for driving the DC fan.

Preferably, the driver chip ignores the control command which is configured to control the driver chip to output an originally-set voltage, and directly provides the preset voltage for driving the DC fan.

Preferably, the control command includes an adjustment command, which is configured to control the driver chip to adjust the output voltage for driving the DC fan to rotate at a safe rotational speed.

According to another purpose of the present disclosure, a driver chip for driving a DC fan is provided, and the driver chip includes an input/output (I/O) module and an over-temperature detection module. The I/O module is configured to provide an output voltage to the DC fan to drive the DC fan to rotate at a rotational speed. The over-temperature detection module is disposed in the driver chip and configured to detect whether a temperature of the driver chip is higher than a first threshold value. When the temperature of the driver chip is higher than the first threshold value, power supply to the driver chip is stopped so as to cool down the driver chip, and when the temperature of the driver chip is lower than a second threshold value, the driver chip is restarted to provide a preset voltage to drive the DC fan to rotate at a preset rotational speed which is higher than the rotational speed.

Preferably, the preset voltage is a maximum driving voltage, and the driver chip drives the DC fan by the maximum driving voltage to rotate at a full rotational speed.

Preferably, the driver chip further includes an over-current detection module disposed in the driver chip and configured to detect whether over-current is occurred in the driver chip, if yes, after being restarted, the driver chip provides an originally-set output voltage to drive the DC fan; if no, the driver chip provides the preset voltage to drive the DC fan to rotate at the preset rotational speed.

Preferably, the driver chip is connected to a hardware monitor terminal or a super I/O chip, which transmits a control command to control the driver chip.

Preferably, the driver chip is controlled by the control command to provide the preset voltage for driving the DC fan.

Preferably, the driver chip ignores the control command which is configured to control the driver chip to output an originally-set voltage, and directly provides the preset voltage for driving the DC fan.

Preferably, the control command includes an adjustment command, which is configured to control the driver chip to adjust the output voltage for driving the DC fan to rotate at a safe rotational speed.

Preferably, the driver chip includes a linear regulator.

According to another purposes of the present disclosure, a control system of over-temperature protection is provided. The control system includes a DC fan and a driver chip. The driver chip is connected to the DC fan, and configured to provide an output voltage to the DC fan to drive the DC fan to rotate at a rotational speed. The driver chip includes an over-temperature detection module disposed in the driver chip configured to detect whether a temperature of the driver chip is higher than a first threshold value. When the temperature of the driver chip is higher than the first threshold value, power supply for the driver chip is stopped to cool down the driver chip, and when the temperature of the driver chip is lower than a second threshold value, the driver chip is restarted to provide a preset voltage to drive the DC fan to rotate at a preset rotational speed which is higher than the rotational speed.

Preferably, the preset voltage is a maximum driving voltage, and the driver chip drives the DC fan by the maximum driving voltage to rotate at a full rotational speed.

Preferably, the control system of over-temperature protection further includes an over-current detection module disposed in the driver chip. The over-current detection module is configured to detect whether over-current is occurred in the driver chip, if yes, after being restarted, the driver chip provides an originally-set output voltage to drive the DC fan; if no, the driver chip provides the preset voltage to drive the DC fan to rotate at the preset rotational speed.

Preferably, the control system of over-temperature protection further includes a hardware monitor terminal or a super I/O chip, which is connected to the driver chip, which transmits a control command to control the driver chip.

Preferably, the driver chip is controlled by the control command to provide the preset voltage for driving the DC fan.

Preferably, the driver chip ignores the control command which is configured to control the driver chip to output an originally-set voltage, and directly provides the preset voltage for driving the DC fan.

Preferably, the control command includes an adjustment command, which is configured to control the driver chip to adjust the output voltage for driving the DC fan to rotate at a safe rotational speed.

Preferably, the driver chip includes a linear regulator.

In brief, the control method of over-temperature protection, driver chip and control system of over-temperature protection according to the present disclosure may be provided with the following advantages.

(1) According to the control method and system of over-temperature protection, the driver chip can be applied to large-current DC fans without any additional circuit configuration. With the present disclosure, the types of the DC fans driven by the driver chip increase, which improves diversity of usage.

(2) The control method of over-temperature protection, driver chip and control system of over-temperature protection can combine the control mechanism of over-temperature protection with the control mechanism of over-current protection, so that the driver chip can be protected from overheating and burn-out during operation of the electronic device, and the life-time of the driver chip is further prolonged.

(3) The control method of over-temperature protection, driver chip and control system of over-temperature protection enables users to adjust the DC fan to rotate at the safe rotational speed, which decreases the rotational speed of the full-speed rotation so as to effectively reduce the noise of the operation. The condition of the safe-speed rotation enables the driver chips to be not only compatible to large current DC fans but also avoid exceeding its original power consumption of heat dissipation of the driver chips. The condition of the safe-speed rotation has effects of reducing the noise and improves the convenience of use.

DETAILED DESCRIPTION OF THE PREFERRED EMBODIMENTS

In order to facilitate the understanding of the technical features, the contents and the advantages of the present disclosure, and the effectiveness thereof that can be achieved, the present disclosure will be illustrated in detail below through embodiments with reference to the accompanying drawings. On the other hand, the diagrams used herein are merely intended to be schematic and auxiliary to the specification, but are not necessary to be true scale and precise configuration after implementing the present disclosure. Thus, it should not be interpreted in accordance with the scale and the configuration of the accompanying drawings to limit the scope of the present disclosure on the practical implementation.

Figure 1:
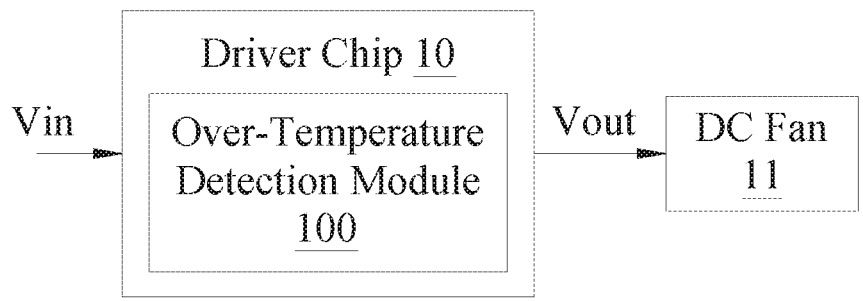
FIG. 1 is a schematic diagram of a driver chip in accordance with an embodiment of the present disclosure.

Referring to FIG. 1, which is a schematic diagram of a driver chip in accordance with an embodiment of the present disclosure. A driver chip 10 is connected to a DC fan 11. An I/O module of the driver chip 10 is arranged to receive the control commands. The driver chip 10 transforms an input voltage $V_{in}$ from a power supply into an output voltage $V_{out}$.

The output voltage $V_{out}$ is then transmitted to the DC fan 11 to drive rotation of the DC fan 11. The magnitude of the output voltage $V_{out}$ corresponds to a rotational speed of the DC fan 11. In general, assuming that 12V of the output voltage $V_{out}$ is provided to drive the DC fan 11 to rotate at a full rotational speed. When starting, at least a half-speed rotation, 6V of the output voltage $V_{out}$, has to be provided to drive the DC fan 11, so that the DC fan 11 may start and continuously rotate. In this case, full-speed rotation refers that the DC fan 11 rotates at a maximum rotational speed; and half-speed rotation refers that the DC fan 11 rotates at a half rotational speed of the full-speed rotation. However, the motor of the DC fan 11, which rotates at a full rotational speed, will result in larger noise. Therefore, when the DC fan 11 successfully reaches the heat dissipation function, users sometimes provide a lower output voltage $V_{out}$ so that the DC fan 11 rotates at a lower rotational speed, thereby reducing the noise produced by the DC fan 11.

Also referring to FIG. 1, the driver chip 10 also includes an over-temperature detection module 100 located in the driver chip 10. The over-temperature detection module 100 is able to detect whether the temperature of the driver chip 10 is higher than a first threshold value. For example, a temperature detector detects chip temperatures of predetermined contacts in the driver chip 10. When the chip temperature is higher than a critical temperature (for example, 80° C.), a mechanism of over-temperature protection control is activated. The mechanism of over-temperature protection control stops supplying power for the driver chip 10 in order to cool down the driver chip 10. In another embodiment, the over-temperature detection module 100 is implemented by a temperature detection circuit and is provided in the driver chip 10. When the chip temperature is higher than a critical temperature, the temperature detection circuit automatic disconnects the power supply so as to cool down the driver chip 10. When the chip temperature is lower to a predetermined threshold value (for example, 60° C.), the driver chip 10 is restarted. The DC fan 11 is provided with an output voltage $V_{out}$ so as to be driven and rotate again. In this operation, although the power supply for the driver chip 10 is suspended so that the DC fan 11 does not receive the output voltage $V_{out}$, the DC fan 11 will remain inertial rotation for a period of time and does not stop immediately. As the period of time (a few seconds) passing, the chip temperature drops and the power supply is restarted. The DC fan 11 will again receive the output voltage $V_{out}$ and is driven to rotate according to magnitude of the output voltage $V_{out}$. Therefore, the DC fan 11 will continuously maintain in a rotational state.

When once again the output voltage $V_{out}$ is provided to the DC fan 11, the driver chip 10 provides a preset voltage to drive the DC fan 11 to rotate at a preset rotational speed which is higher than the rotational speed. The preset voltage is set as the maximum output voltage $V_{out}$ of the driver chip 10, so that the driver chip 10 drives the DC fan 11 to rotate at a full rotational speed. Since at the full-speed rotation, the input voltage $V_{in}$ of the driver chip 10 is equal to the output voltage $V_{out}$, it does not have to consider the voltage difference between the input voltage $V_{in}$ and the output voltage $V_{out}$, which causes the resistance to generate greater heat and affects efficiency of heat dissipation. Therefore, without changing the efficiency of heat dissipation of the driver chip 10, the DC fan 11 is provided with a greater current and driven to rotate. Although continuously rotating at the full-speed rotation creates greater noise, the purposes to install large current fans are mostly to seek for better efficiency of heat dissipation. As such, continuously maintaining at the full-speed rotation is helpful to dissipate the heat generated by the internal components of the electronic device. In addition, the over-temperature detection module 100 described herein is regarded as a real-time monitoring module. Every time the electronic device starts or restarts as a result of installing a new DC fan 11, the over-temperature detection module 100 executes the real-time monitoring. When the chip temperatures exceed the critical value, the aforementioned control method of over-temperature protection is activated. The over-temperature detection module 100 simultaneously contributes to a protection mechanism for the driver chip 10 and meets the requirement of the DC fan 11 driven by a large current. Details of the control method of over-temperature protection are described as follows.

Figure 2:
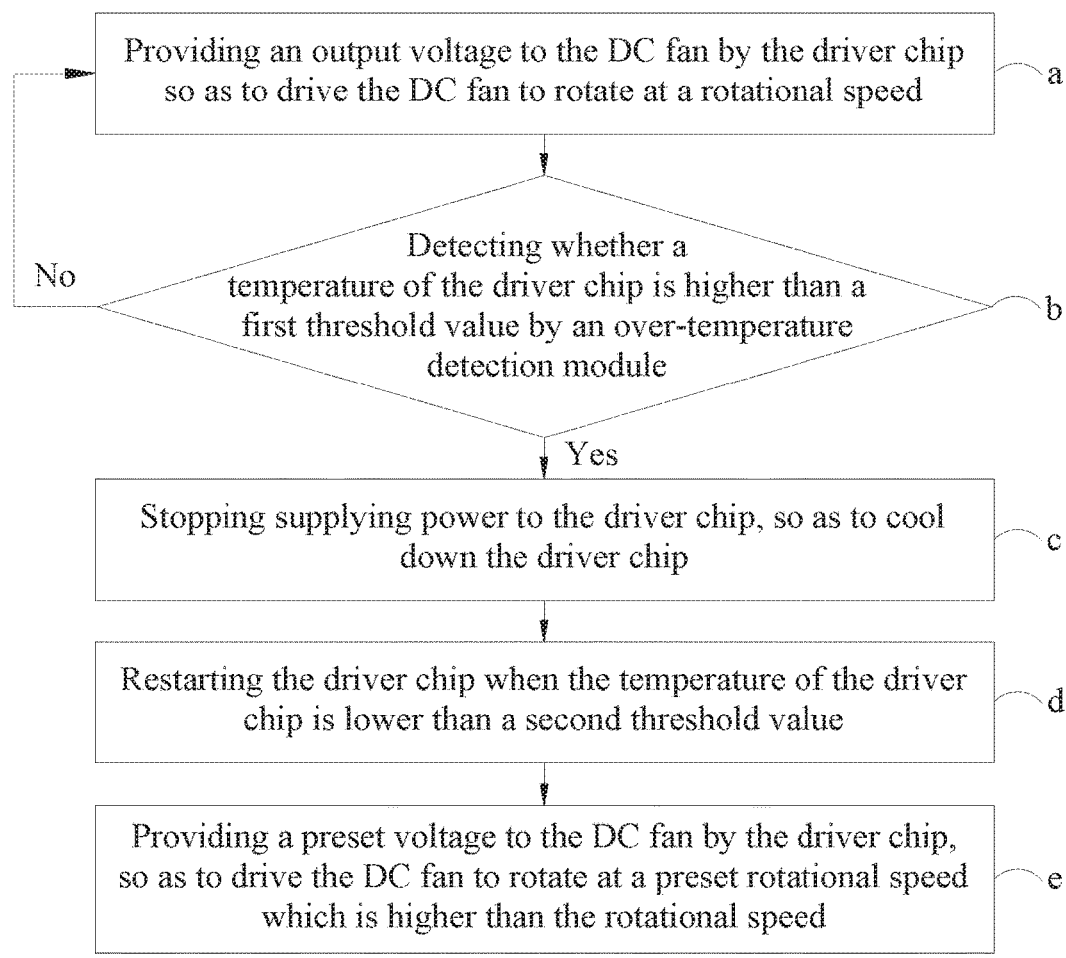
FIG. 2 is a flow chart illustrating a control method of over-temperature protection in accordance with an embodiment of the present disclosure.

Referring to FIG. 2, which is a flow chart illustrating a control method of over-temperature protection in accordance with an embodiment of the present disclosure. As shown, the control method of over-temperature protection includes the following steps:

Step a: a driver chip provides an output voltage to a DC fan so as to drive the DC fan to rotate at a rotational speed.

Step b: detecting whether a temperature of the driver chip is higher than a first threshold value by an over-temperature detection module.

Step c: stopping supplying power to the driver chip so as to cool down the driver chip.

Step d: when the temperature of the driver chip is lower than a second threshold value, restarting the driver chip.

Step e: the driver chip provides a preset voltage to drive the DC fan to rotate at a preset rotational speed which is higher than the rotational speed.

In step a, the driver chip connects to a hardware monitor of a front end. At the hardware monitor terminal, a rotational speed of start-up of the DC fan is set by a program. Control commands according to the predetermined rotational speed are transmitted to the driver chip. Alternatively, the driver chip is connected to a super I/O chip. The super I/O chip sends out control commands, which transform input voltages transmitted to the driver chip into an original output voltage. The original output voltage outputs to the DC fan and drives the DC fan to rotate at an original rotational speed in response to the original output voltage. In step b, after the device boots or restarts, the driver chip receives the control commands and then drives the DC fan. At this time, the over-temperature detection module begins to monitor the driver chip whether the temperature of the driver chip is higher than the first threshold value. Detection methods are the same as the previous embodiments, and are not described again herein.

The over-temperature detection module detects the driver chip whether the temperature of the driver chip is higher than the first threshold value. If yes, a mechanism of an over-temperature protection control of step c is activated. If no, the procedure returns to step A, the temperature of the driver chip continues to be monitored. If activation of the over-temperature protection control is confirmed, the power supply to the driver chip is stopped. Further, the driver chip also stops supplying power to the DC fan, which causes the driver chip to cool down without any operation. In step d, when the temperature of the driver chip is lower than the second threshold value, the driver chip is restarted. In another embodiment, the driver chip is restarted after a period of preset time. At this time in step e, a preset voltage provided by the driver chip replaces the original output voltage, wherein the preset voltage is higher than the original output voltage. The preset voltage provided by the driver chip drives the DC fan to rotate at a preset rotational speed. The preset rotational speed is faster than its original rotational speed. The preset voltage herein can be equal to the maximum output voltage of the driver chip. In another embodiment, the preset voltage can be equal to a voltage value between the original output voltage and the maximum output voltage.

Figure 3:
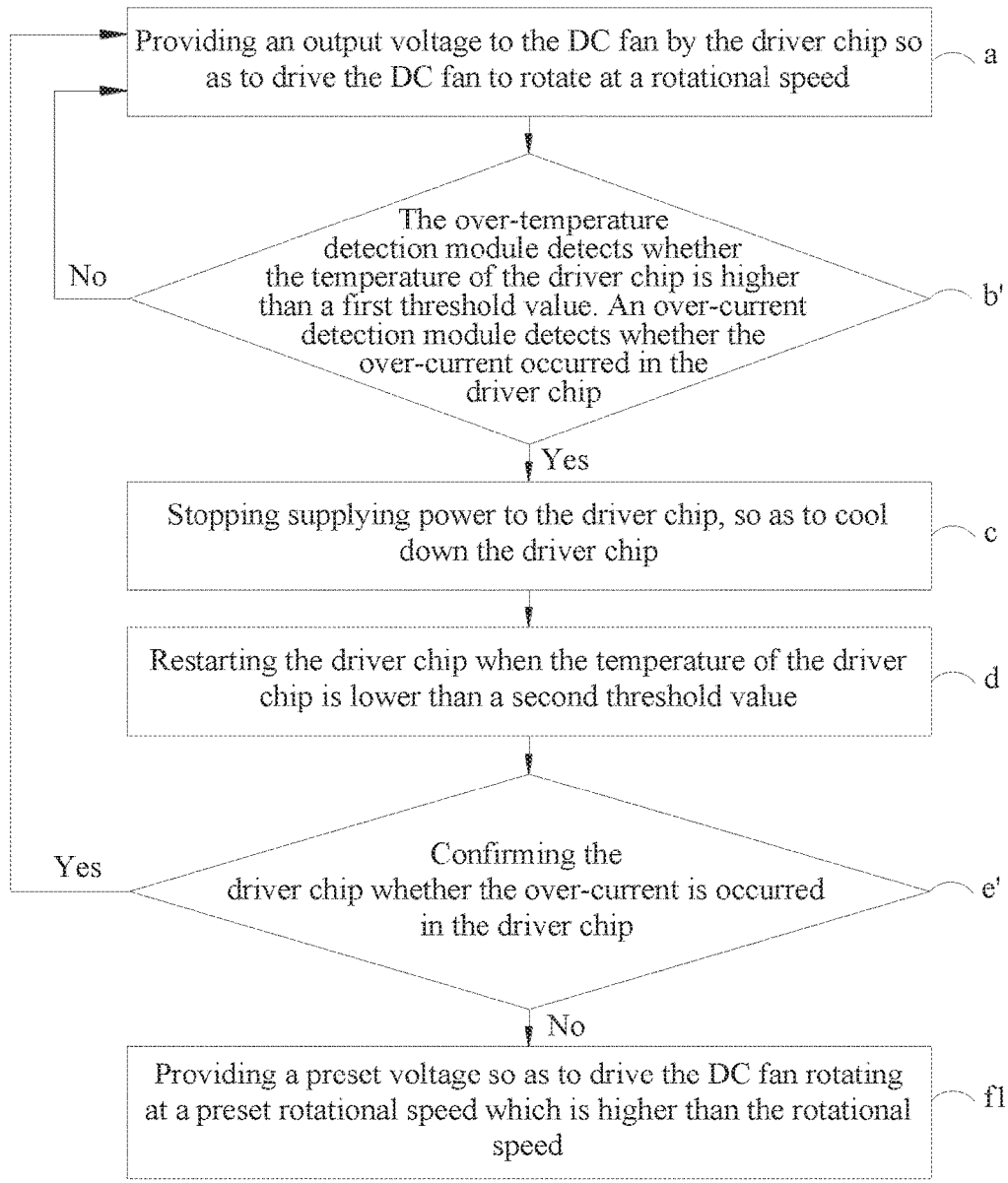
FIG. 3 is a flow chart illustrating a control method of over-temperature protection in accordance with another embodiment of the present disclosure.

Referring to FIG. 3, which is a flow chart illustrating a control method of over-temperature protection in accordance with another embodiment of the present disclosure. A part of the control method of over-temperature protection in this embodiment is the same as some steps of the aforementioned embodiment. The same steps will not be described again. The main differences are as follows.

Step b': the over-temperature detection module detects whether the temperature of the driver chip is higher than a first threshold value. In addition, an over-current detection module detects whether the over-current is occurred in the driver chip. The driver chip further includes the over-current detection module, wherein the over-current detection module detects whether the driver chip has a phenomenon of short circuit. By comparing whether the passing current exceeds a critical current value, abnormality or short circuit of internal circuit of the driver chip is determined. The abnormality or short circuit of the internal circuit of the driver chip causes a rising temperature. In addition, the over-current detection module will send out a warning signal when the passing current is abnormal.

Step e': confirming the driver chip whether the over-current is occurred in the driver chip. If yes, the procedure returns to step a. An originally-set output voltage is provided to drive the DC fan. If no, the procedure proceeds to step f1: providing a preset voltage so as to drive the DC fan to rotate at a preset rotational speed which is higher than the rotational speed. After restarting the driver chip, the original output voltage or the preset voltage is decided to drive the DC fan in accordance with whether the over-current is occurred in the driver chip. The preset voltage is equivalence with the magnitude of the previous embodiments. That it, the preset voltage may equal to the maximum output voltage of the driver chip. Alternatively, the preset voltage can be equal to a voltage value between the original output voltage and the maximum output voltage. At this moment, the driver chip can also execute Step b' again. When the DC fan rotates at a higher rotational speed, the monitoring of the over-temperature of the driver chip continuous to proceed.

Figure 4:
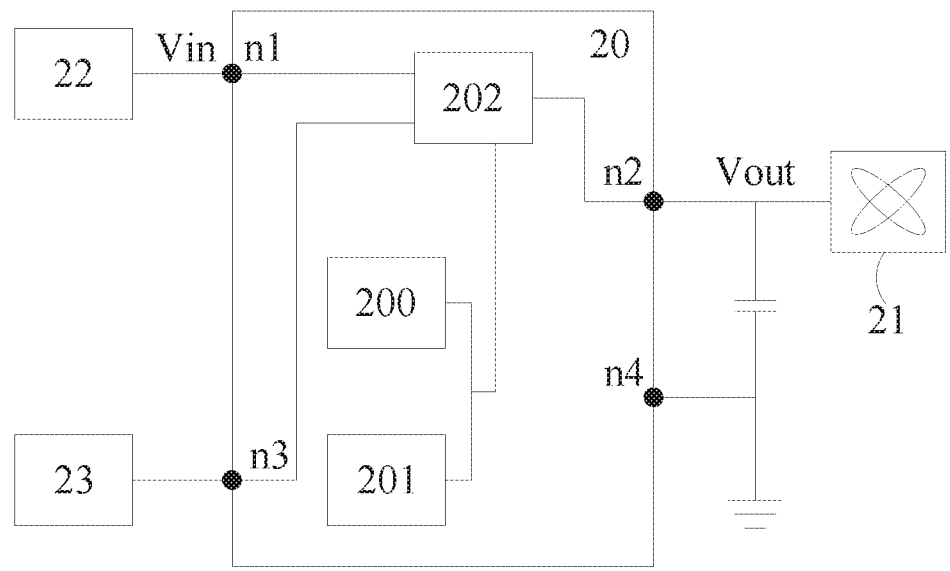
FIG. 4 is a schematic diagram illustrating a control system of over-temperature protection in accordance with an embodiment of the present disclosure.

Referring to FIG. 4, which is a schematic diagram illustrating a control system of over-temperature protection in accordance with an embodiment of the present disclosure. As shown, the control system of over-temperature protection includes a driver chip 20 and a DC fan 21, wherein the driver chip 20 includes a linear regulator (such as a low dropout regulator), an over-temperature detection module 200, an over-current detection module 201, and an I/O module 202. The over-temperature detection module 200 and the over-current detection module 201 are respectively connected to the I/O module 202. Meanwhile, the driver chip 20 includes a plurality of pins. A first pin n1 connects to an access voltage 22 and the I/O module 202. The access voltage 22 provides the driver chip 20 with an input voltage $V_{in}$. A second pin n2 connects to the I/O module 202 and the DC fan 21. The I/O module 202 provides an output voltage $V_{out}$ to the DC fan 21 in accordance with control commands. A third pin n3 connects to a control chip 23 of a front end. The control chip 23 is implemented by a hardware monitor terminal or a super I/O chip. Finally, a fourth pin n4 is grounded.

Also referring to FIG. 4, the control chip 23 can transmit control signals to the I/O module 202. That is, the control chip 23 transmits control commands to the I/O module 202. The control chip 23 controls the output voltage $V_{out}$ provided from the driver chip 20 to the DC fan 21. For example, an original input voltage $V_{in}$ is 12V. The control chip 23 sends out a control command of half-speed rotation, which enables the I/O module 202 to provide a 6V output voltage for the DC fan 21. Meanwhile, if the power consumption of heat dissipation of the driver chip 20 is 2 W, which is calculated in accordance with the power formula (P=IV), the passing current is 0.33A. If a large current DC fan 21 over 1.5A is installed, a corresponding large current cannot be provided at the half-speed rotation. However, if at the time of a full-speed rotation, an internal resistance of a linear regulator of the driver chip 20 is 200 mΩ; under the same power consumption of heat dissipation, the passing current is 3.16A, which is enough to provide most scales of large current DC fan 21. Therefore, in this embodiment, when the control system of over-temperature protection operates, the over-temperature detection module 200 and the over-current detection module 201 respectively detects whether the temperature of the driver chip is higher than the first threshold value or the over-current is occurred in the driver chip. When the chip temperatures exceed a critical temperature value (for example, 80° C.), a mechanism of over-temperature protection control is activated. The access voltage 22 stops supplying the power. Waiting until the temperature of the driver chip 20 drops to the predetermined second threshold value (for example, 60° C.), and the access voltage 22 restarts supplying the power. Meanwhile, whether the over-temperature of the driver chip is caused by an over-current is judged. If the passing current does not exceed a critical current value (for example, 4A), no abnormality or no short circuit of internal circuit causing the over-temperature of the driver chip is confirmed. At this time, a control command of the full-speed rotation is generated and transmitted to the I/O module 202. The control command restarts supplying the power and continuously drives the DC fan 21 to rotate at the full rotational speed. That is, an output voltage $V_{out}$ provided to the DC fan 21 is maintained as the maximum output voltage $V_{out}$ corresponding to the full-speed rotation. As such, the driver chip 20 matches the aforementioned 3.16A of large current DC fan 21, which is enough to encompass most scales of the DC fan 21. The control command provided by the control chip 23 herein replaces its original control command of half-speed rotation. The control command herein is configured to control the driver chip 20 to output maximum output voltage $V_{out}$ to drives the DC fan 21 to continuously rotate at the full rotational speed. In another embodiment, the driver chip 20 may ignore the control commands transmitted from the control chip 23, which are configured to control the driver chip to output the originally-set voltage. The driver chip 20 directly provides the maximum output voltage $V_{out}$ corresponding to the full-speed rotation to the DC fan 21. The maximum output voltage $V_{out}$ enables the DC fan 21 to rotate at the full rotational speed. By using the control system of over-temperature protection, the driver chip 20 achieves the effect of heat dissipation without increasing the chip area for heat sink. In addition, there is no need to make any particular setup for the DC fan 21. The above mentioned hardware detection method is suitable for driving large current DC fan 21.

Figure 5:
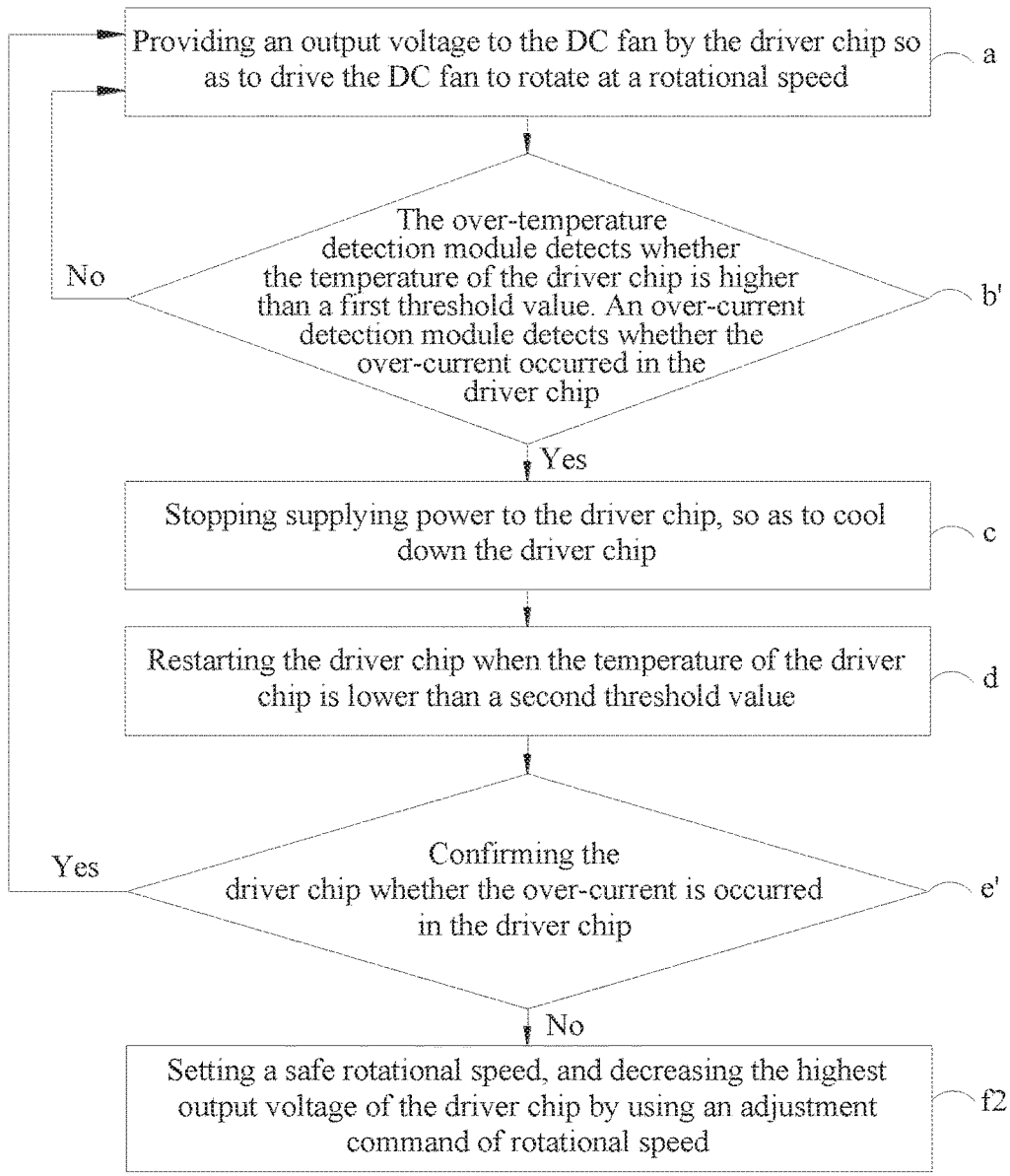
FIG. 5 is a flow chart illustrating a control system of over-temperature protection in accordance with another embodiment of the present disclosure.

Referring to FIG. 5, which is a flow chart illustrating a control system of over-temperature protection in accordance with another embodiment of the present disclosure. FIG. 5 derives from the control system of over-temperature protection of FIG. 3. The same steps will not be described again. The main difference is that step f1 is replaced by Step f2.

Step f2: setting a safe rotational speed, and decreasing the maximum output voltage of the driver chip by using an adjustment command of rotational speed. The rotational speed of the DC fan is thus decreased. Referring to previous embodiments, when the DC fan rotates at full rotational speed, a current up to 3A of DC fan can be equipped. However, a general DC fan may not need such a large current. After the maximum output voltage corresponding to the full-speed rotation is provided, the users may adjust the rotational speed and set a safe rotational speed for requirement. The condition of the secure-speed rotation provides an enough large current and does not exceed its original power consumption of heat dissipation of driver chip. In addition, decreasing the rotational speed (for example, 75% of the full-speed rotation) effectively reduce noise of operation, thus achieving a better auditory environment for users. The safe-speed rotation can be set up through a hardware monitor or a super I/O chip. Further, the adjustment command of the rotational speed is transmitted to the driver chip so as to drive the DC fan to rotate at an optimum rotational speed.

The above description is only illustrative, but is not restrictive. Any disclosures without departing from the spirit and scope of the present invention and its equivalent modifications or changes, should be enclosed within the scope of the appended claims.

What is claimed is:

1. A control method of over-temperature protection, the control method being adapted to a driver chip for driving a DC fan, and comprising the following steps:
   a. providing an output voltage to the DC fan by the driver chip so as to drive the DC fan to rotate at a rotational speed;
   b. detecting whether a temperature of the driver chip is higher than a first threshold value, by an over-temperature detection module;
   c. stopping supplying power to the driver chip when the temperature of the driver chip is higher than the first threshold value, so as to cool down the driver chip;
   d. restarting the driver chip when the temperature of the driver chip is lower than a second threshold value; and
   e. providing a preset voltage to the DC fan by the driver chip, so as to drive the DC fan to rotate at a preset rotational speed which is higher than the rotational speed.

2. The control method of over-temperature protection of claim 1, wherein the preset voltage is a maximum driving voltage, and the driver chip drives the DC fan by the maximum driving voltage to rotate at a full rotational speed.

3. The control method of over-temperature protection of claim 1, further comprising a step of detecting whether over-current is occurred in the driver chip, by using an over-current detection module, and the step e further comprising a substep of:
   e'. checking whether the over-current is occurred in the driver chip, if yes, providing an originally-set output voltage to drive the DC fan; if no, providing the preset voltage to drive the DC fan to rotate at the preset rotational speed.

4. The control method of over-temperature protection of claim 1, wherein the driver chip is connected to a hardware monitor or a super I/O chip, which transmits a control command to the driver chip for controlling the driver chip.

5. The control method of over-temperature protection of claim 4, wherein the driver chip is controlled by the control command to provide the preset voltage for driving the DC fan.

6. The control method of over-temperature protection of claim 4, wherein, after the step d, the driver chip ignores the control command which is configured to control the driver chip to output an originally-set voltage, and directly provides the preset voltage for driving the DC fan.

7. The control method of over-temperature protection of claim 4, wherein the control command comprises an adjustment command, which is configured to control the driver chip to adjust the output voltage for driving the DC fan to rotate at a safe rotational speed.

8. A driver chip for driving a DC fan, comprising:
   an I/O module, configured to provide an output voltage to the DC fan to drive the DC fan to rotate at a rotational speed; and
   an over-temperature detection module disposed in the driver chip, configured to detect whether a temperature of the driver chip is higher than a first threshold value;
   wherein when the temperature of the driver chip is higher than the first threshold value, power supply to the driver chip is stopped so as to cool down the driver chip, and when the temperature of the driver chip is lower than a second threshold value, the driver chip is restarted to provide a preset voltage to drive the DC fan to rotate at a preset rotational speed which is higher than the rotational speed.

9. The driver chip of claim 8, wherein the preset voltage is a maximum driving voltage, and the driver chip drives the DC fan by the maximum driving voltage to rotate at a full rotational speed.

10. The driver chip of claim 8, further comprising:
    an over-current detection module disposed in the driver chip, configured to detect whether over-current is occurred in the driver chip, if yes, after being restarted, the driver chip provides an originally-set output voltage to drive the DC fan; if no, the driver chip provides the preset voltage to drive the DC fan to rotate at the preset rotational speed.

11. The driver chip of claim 8, wherein the driver chip is connected to a hardware monitor terminal or a super I/O chip, which transmits a control command to control the driver chip.

12. The driver chip of claim 11, wherein the driver chip is controlled by the control command to provide the preset voltage for driving the DC fan.

13. The driver chip of claim 11, wherein the driver chip ignores the control command which is configured to control the driver chip to output an originally-set voltage, and directly provides the preset voltage for driving the DC fan.

14. The driver chip of claim 11, wherein the control command comprises an adjustment command, which is configured to control the driver chip to adjust the output voltage for driving the DC fan to rotate at a safe rotational speed.

15. A control system of over-temperature protection, comprising:
    a DC fan; and
    a driver chip connected to the DC fan, configured to provide an output voltage to the DC fan to drive the DC fan to rotate at a rotational speed, the driver chip comprising an over-temperature detection module disposed in the driver chip, configured to detect whether a temperature of the driver chip is higher than a first threshold value;

wherein when the temperature of the driver chip is higher than the first threshold value, power supply for the driver chip is stopped to cool down the driver chip, and when the temperature of the driver chip is lower than a second threshold value, the driver chip is restarted to provides a preset voltage to drive the DC fan to rotate at a preset rotational speed which is higher than the rotational speed.

16. The control system of over-temperature protection of claim 15, wherein the preset voltage is a maximum driving voltage, and the driver chip drives the DC fan by the maximum driving voltage to rotate at a full rotational speed.

17. The control system of over-temperature protection of claim 15, further comprising:
an over-current detection module disposed in the driver chip, configured to detect whether over-current is occurred in the driver chip, if yes, after being restarted, the driver chip provides an originally-set output voltage to drive the DC fan; if no, the driver chip provides the preset voltage to drive the DC fan to rotate at the preset rotational speed.

18. The control system of over-temperature protection of claim 15, further comprising:
a hardware monitor terminal or a super I/O chip connected to the driver chip, which transmits a control command to control the driver chip;
wherein the driver chip is controlled by the control command to provide the preset voltage for driving the DC fan.

19. The control system of over-temperature protection of claim 18, wherein the driver chip ignores the control command which is configured to control the driver chip to output an originally-set voltage, and directly provides the preset voltage for driving the DC fan.

20. The control system of over-temperature protection of claim 18, wherein the control command comprises an adjustment command, which is configured to control the driver chip to adjust the output voltage for driving the DC fan to rotate at a safe rotational speed.

* * * * *